(12) United States Patent
Bunnelle et al.

(10) Patent No.: US 9,487,683 B2
(45) Date of Patent: Nov. 8, 2016

(54) REACTIVE HOT MELT

(71) Applicant: IFS Industries, Inc., Reading, PA (US)

(72) Inventors: William L. Bunnelle, Ham Lake, MN (US); John K. Fromwiller, Reading, PA (US)

(73) Assignee: IFS Industries Inc., Reading, PA (US)

( * ) Notice: Subject to any disclaimer, the term of this patent is extended or adjusted under 35 U.S.C. 154(b) by 0 days.

(21) Appl. No.: 14/384,995

(22) PCT Filed: Mar. 12, 2013

(86) PCT No.: PCT/US2013/030548
§ 371 (c)(1),
(2) Date: Sep. 12, 2014

(87) PCT Pub. No.: WO2013/138350
PCT Pub. Date: Sep. 19, 2013

(65) Prior Publication Data
US 2015/0051358 A1    Feb. 19, 2015

Related U.S. Application Data

(60) Provisional application No. 61/609,666, filed on Mar. 12, 2012.

(51) Int. Cl.
| | | |
|---|---|---|
| *C09J 153/00* | (2006.01) | |
| *C08G 18/66* | (2006.01) | |
| *C08G 18/76* | (2006.01) | |
| *C08G 18/12* | (2006.01) | |
| *C09J 175/08* | (2006.01) | |

(52) U.S. Cl.
CPC .............. *C09J 153/00* (2013.01); *C08G 18/12* (2013.01); *C08G 18/664* (2013.01); *C08G 18/7664* (2013.01); *C09J 175/08* (2013.01); *C08G 2170/20* (2013.01); *C09J 2201/61* (2013.01)

(58) Field of Classification Search
CPC .. C09J 153/00; C09J 175/08; C09J 2201/61; C08G 18/12; C08G 18/664; C08G 18/7664; C08G 2170/20
See application file for complete search history.

(56) References Cited

U.S. PATENT DOCUMENTS 5,173,538 A * 12/1992 Gilch et al. .................... 525/130

FOREIGN PATENT DOCUMENTS

| EP | 1650282 A1 * | 4/2006 |
| EP | 1832614 A3 | 3/2009 |
| EP | 1650282 B1 | 12/2010 |
| WO | WO 2008147845 A1 * | 12/2008 |
| WO | WO2009086069 A1 | 7/2009 |

OTHER PUBLICATIONS

International Search Report and Written Opinion for PCT/US2013/030548, mailed Jul. 8, 2013, 8 pages.
International Preliminary Report on Patentability for PCT/US2013/030548, issued Sep. 16, 2014, 6 pages.

* cited by examiner

*Primary Examiner* — Irina S Zemel
*Assistant Examiner* — Jeffrey Lenihan
(74) *Attorney, Agent, or Firm* — Fish & Richardson P.C.

(57) ABSTRACT

The reactive moisture cure hot melt adhesives of the invention have substantially improved assembly properties as a result of the unique combination of materials that provide excellent green strength. The adhesive includes at least an isocyanate compound, a polyether polyol, an aromatic tackifying composition, a thermoplastic polymer, and a block polymer having at least an A block and at least a B block, wherein the A block comprises a crystalline or semi-crystalline block and the B block comprises a rubbery or amorphous block. Such block polymers can have linear, branched, radial, or dendritic morphologies.

20 Claims, No Drawings

REACTIVE HOT MELT

This application is a U.S. National Stage application under 35 U.S.C. 371 of PCT International Patent application No. PCT/US2013/030548, entitled "REACTIVE HOT MELT", filed on Mar. 12, 2013 in the name of IFS Industries Inc., a U.S. national corporation, applicant for the designation of all countries and William L. Bunnelle, a U.S. Citizen, and John K. Fromwiller, a U.S. Citizen, inventors only for the designated states, and claims the benefit of U.S. Provisional Patent Application No. 61/609,666, filed Mar. 12, 2012, the contents of both of which are herein incorporated by reference in their entirety.

FIELD

The invention relates to hot melt adhesives and in particular moisture cure reactive hot melt adhesives having improved green strength and final permanent bonds when applied to commonly available manufacturing work pieces and assembled unit substrates.

BACKGROUND

Reactive hot melt moisture cure adhesives are typically solid and nonreactive at typical ambient temperatures. The adhesives, however, when heated to a melt temperature can be extruded onto a work piece with other components to form an initial "green bond" that can subsequently be cured to form a rigid, mechanically stable bond after cooling. In the assembly of a final unit, the adhesive preferably can be easily applied at melt temperature, and can be compatible with the work piece surfaces. When assembled into a unit including two or more work piece surfaces and an adhesive bond, the material must maintain both a high "green strength" (cohesive strength of the adhesive prior to cure) and a permanent adhesive bond when cure is complete. Green strength is important to maintain the structural integrity of the work piece during manufacture. Any substantial relative movement of the work pieces in the assembled unit can result in substantially reduced productivity or nonworkable products.

We have found in many industries a substantial need for an improved hot melt moisture cure reactive hot melt adhesive that can be used in a variety of end use applications, typically in unit product assembly, which has beneficial properties in ease of application at melt temperature, high green strength after application and substantially improved strength after curing.

SUMMARY

The reactive moisture cure hot melt adhesives of the invention have substantially improved properties as a result of the unique combination of materials that provide excellent assembly properties. The adhesive comprises a blend of at least a diisocyanate compound or blend of diisocyanate compounds, a polyether polyol (or block copolyether polyol), an aromatic tackifier, a thermoplastic polymer, and an acrylic block polymer having at least an A block and at least a B block (as an A-B or A-B-A polymer) wherein the A block comprises a crystalline or semi-crystalline block and the B block comprises a rubbery or amorphous block. The block polymers (copolyether polyols or acrylics) employed in the adhesive compositions can have linear, branched, radial, or dendritic morphologies. The polyol is preferably free of any substantial amount of crystalline polyol or polyester polyols. In important embodiments of the invention, the adhesive can be used in a variety of manufacturing processes in which a first work piece is joined to a second work piece using the adhesive of the invention while maintaining a high initial green strength before and during the curing reaction to form a strong permanent mechanically stable bond after cure is complete. Another aspect of the invention is the assembled unit comprising a first work piece joined to a second work piece with an adhesive bond, the adhesive bond formed by the cured adhesive of the invention.

While the invention is susceptible to various modifications and alternative forms, specifics thereof have been shown by way of example and data, and will be described in detail. The invention is not limited to the particular embodiments described. On the contrary, the intention is to cover modifications, equivalents, and alternatives falling within the spirit and scope of the invention.

DETAILED DESCRIPTION

Definitions

For the purposes of this disclosure, "green strength" means workability of an adhesive of the invention prior to complete cure. More specifically, "green strength" means the cohesive strength of an adhesive of the invention prior to cure, whether in the melt or at ambient temperature. In embodiments, creep resistance is a measure of green strength.

For the purposes of the disclosure, "green bond" means the adhesive strength of an adhesive of the invention to a work piece, prior to complete cure.

Adhesive Components.

Diisocyanate compounds are used in formulating the moisture cure hot melt adhesives of the invention. Methylene diphenyl diisocyanate, or MDI, is a common isocyanate product used in industrial settings and is suitably employed in the adhesives of the invention. PMDI is a primary technical/commercial blend of MDI isomers and derivatives that is also suitably employed in the adhesives of the invention. Typically, PMDI is a semisolid or liquid mixture (at standard laboratory temperature) that contains 25-80 mole % monomeric 4,4'-MDI as well as oligomers containing 3-6 rings and other minor isomers, such as the 2,2'-isomer. The composition of PMDI varies with the manufacturer and use. The range of variation reflects variations from various sources of information. The theoretical chemical structure of MDI (predominantly 2,2'- and 4,4'-isomers) is

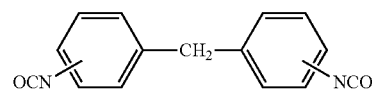

whereas MDI oligomers present in PMDI have the general structure

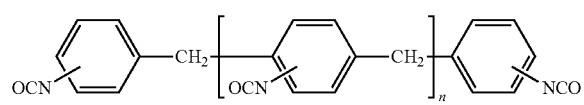

wherein n is typically 1-8.

Table 1 provides Chemical Abstracts Service (CAS) registry numbers of several MDI isomers and PMDI.

TABLE 1

CAS registry numbers of MDI isomers and PMDI.

| Name | CAS # |
|---|---|
| 4,4'-MDI | 101-68-8 |
| 2,4'-MDI | 5873-54-1 |
| 2,2'-MDI | 2536-05-2 |
| PMDI | 9016-87-9 |

Monomeric 4,4'-MDI is a white to pale yellow solid at room temperature, with a molecular weight of 250.26. It has a boiling point of greater than 300° C. at 101.3 kPa, a melting point of 39-43° C. (capillary method) or 40° C. PMDI is produced commercially from aniline and formaldehyde using hydrochloric acid as catalyst. This condensation reaction produces methylene diphenyl diamine (MDA) and a complex mixture of polyamines, which are phosgenated to obtain a methylene diphenyl diisocyanate mixture. 4,4'-MDI can be obtained directly from this mixture using standard purification techniques. Other isocyanate containing compounds, including aromatic diisocyanates and aliphatic-aromatic diisocyanates, are suitably employed in the adhesive compositions of the invention. Specific examples of suitable isocyanate-containing compounds include, but are not limited to, toluene diisocyanate, 4,4'-diphenylmethane diisocyanate, xylylene diisocyanate, 1,4-naphthylene diisocyanate, 1,5-naphthylene diisocyanate, m-phenylene diisocyanate, p-phenylene diisocyanate, diphenyl4,4'-diisocyanate, azobenzene 4,4'-diisocyanate, diphenylsulphone-4,4'-diisocyanate, 2,4-tolylene diisocyanate, 1-chlorobenzene-2,4-diisocyanate, 4,4',4''-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. Such compounds are commercially available and methods for synthesizing them are well known in the art. Preferred isocyanate-containing compounds suitably employed in the adhesives of the invention are MDI, PMDI, and toluene diisocyanate (TDI).

Polyol compounds are also used in formulating the moisture cure hot melt adhesives of the invention. Suitable polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, castor oil and vegetable oils of different molecular weight and functionality, other fatty polyols, polybutadiene diol, and polyisobutylene diol as well as mixtures thereof. In embodiments, the polyols include a linear and/or branched polyether having hydroxyl groups, and contain substantially no functional group other than the hydroxyl groups. Examples of suitable polyether polyols include polyoxyalkylene polyol such as polyethylene glycol, polypropylene glycol, polybutylene glycol, copolymers and blends thereof, and the like as well as copolymers of the polyoxyalkylene polyols listed above with other components. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexandiol-1,3-glycerin, 1,2,6-hexane triol, trimethylol propane, trimethylol ethane, tris(hydroxyphenyl)propane, triethanolamine, triisopropanolamine, ethylenediamine, and ethanolamine; with at least one compound selected from the group consisting of ethylene oxide, propylene oxide and butylene oxide.

A number of suitable polyols are commercially available. Suitable commercial polyols available from Bayer MaterialScience AG of Leverkusen, Germany include ACCLAIM® 8700, ACCLAIM® 8200, ACCLAIM® 12,200, ARCOL® PPG-425, ARCOL® PPG 2000, and ARCOL® PPG 2025. Other companies supply suitably used polyols, including POLY G® 20-56 (obtained from Arch Chemicals of Norwalk, Conn.) and PLURACOL® P-2010 (obtained from BASF® SE of Ludwigshafen am Rhein, Germany), polyester or copolyester polyols such as DYNACOLL® 7360 (obtained from Evonik Degussa GmbH of Essen, Germany), FOMREZ® 66-32 (obtained from Chemtura Corporation of Middlebury, Conn.), RUCOFLEX® S-105-30 (obtained from Bayer MaterialScience AG of Leverkusen, Germany) and STEPANPOL® PD-56 (obtained from the Stepan Company of Northfield, Ill.), and polybutadiene polyols such as POLY BD® R-45HTLO (obtained from Sartomer USA, LLC of Exton, Pa.). Preferred polyols for use in the adhesives of the invention include a blend of at least two polyols having different molecular weights. For example, the blend can contain at least one polyether polyol with a number average molecular weight ($M_n$) of less than or equal to about 4000 and a second polyether polyol with a $M_n$ greater than or equal to 4000, or $M_n$ greater than or equal to 6000, or $M_n$ greater than or equal to 7000.

In some embodiments, preferred polyols include a blend of a first polyol with a $M_n$ greater than or equal to about 5000, a second polyol having $M_n$ between about 1000 and 5000, and a third polyol having having $M_n$ between about 100 and 1000. In some embodiments, the polyol having $M_n$ greater than or equal to about 5000 has $M_n$ of between about 5000 and 50,000, or between about 6000 and 20,000, or between about 7,000 and 17,500, or between about 7,000 and 13,000. In some embodiments, one or more of the polyols or polyol mixtures are free of a crystalline component. In embodiments, the one or more polyols are free of polyester moieties.

Thermoplastic polymers are used in formulating the moisture cure hot melt adhesives of the invention. Preferably one or more thermoplastic polymer(s) are included in the adhesives wherein the one or more thermoplastic polymers have a random copolymer molecular format. The term "copolymer" includes polymers with two, three or more monomer constituents, wherein the constituents are randomly polymerized or are block copolymerized, or a combination thereof, e.g. randomly copolymerized blocks of different compositions. The thermoplastic polymer include acrylic polymers, hydroxy functional acrylic polymers, polyvinyl acetate, polyvinyl chloride, methylene polyvinyl ether, cellulose acetate, styrene acrylonitrile, amorphous polyolefin, thermoplastic polyurethane, polyacrylonitrile, EVA, ethylene/acrylate, ethyl methacrylate, ethyl hexyl acrylate, ethylene-n-butyl acrylate, ethylene butadiene copolymers and/or block copolymers, and mixtures and copolymers thereof. Examples of useful thermoplastic polymers include α-olefin homopolymers, copolymers, and terpolymers of aliphatic mono-1-olefins (α-olefins), that is, poly(α-olefin) polymers wherein the α-olefin monomers contain from 2 to 10 carbon atoms; homogeneous linear or substantially linear co- and terpolymers of ethylene having at least one $C_3$ to $C_{20}$ α-olefin. Other examples of useful thermoplastic polymers include polyisobutylenes, poly(alkylene oxides), poly(phenylenediamine terephthalamide), polyesters (e.g., polyethylene terephthalate, polyethylene naphthalate, and the like), polyacrylates, polymethacrylates, polyacrylamides, polyacrylonitriles, copolymers of acrylonitrile and monomers including, e.g., butadiene, styrene, and the like, such as styrene-acrylonitrile, acrylonitrile-butadiene-styrene, and acrylonitrile-styrene-butadiene polymers; polymethyl pentene, and polyphenylene sulfide, polyimides, polyamides, copolymers of vinyl alcohol and ethylenically unsaturated monomers, polyvinyl acetate (e.g., ethylene vinyl acetate), polyvinyl alcohol, vinyl chloride homopolymers and copolymers (e.g., polyvinyl chloride), copolymers of acrylic acid esters and carbon monoxide, terpolymers of ethylene, carbon monoxide and acrylic acid ester or vinyl monomer, polysiloxanes, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

In embodiments, preferred thermoplastic polymers include ethylene acrylic polymers having a acrylic monomer content of from about 10% by weight to about 60% by weight and a melt index of from about 0.2 to 1000, or an acrylic content of from about 18% by weight to about 50% by weight and a melt index of from about 0.2 to 500.

Useful commercially available thermoplastic polymers include ethylene vinyl acetate copolymers available under the ATEVA® series of trade designations from Celanese EVA Performance Polymers of Edmonton, Alberta, Canada, including ATEVA® 4030MC and ATEVA® 1850; the ELVAX® series of trade designations from DuPont de Nemours of Wilmington, Del.; and the ULTRATHENE® series of trade designations from LyondellBasell Industries of Houston, Tex.; ethylene methyl acrylate copolymers available under the OPTEMA® series of trade designations from ExxonMobil Chemical Co. of Houston, Tex.; ethylene n-butyl acrylate copolymers available under the LOTRYL® series of trade designations from Arkema Inc. of Philadelphia, Pa.; the ESCORENE® series of trade designations from ExxonMobil Chemical Co. of Houston, Tex.; ethylene n-butyl acrylate carbon monoxide terpolymers available under the ELVALOY® series of trade designations from DuPont de Nemours of Wilmington, Del.; thermoplastic polyurethane polymers available under the PEARLSTICK® series of trade designations from Merquinsa of Seabrook, N.J.; butylene/poly(alkylene ether) phthalate polymers available under the HYTREL® series of trade designations from DuPont de Nemours of Wilmington, Del.; ethylene acrylate copolymers also available under the ELVALOY® series of trade designations from DuPont de Nemours of Wilmington, Del.; and acrylic polymers available under the ELVACITE® series of trade designations from Lucite International, Inc. of Southampton, United Kingdom.

The molecular weight of the thermoplastic polymers is not particularly limited as to applicability in the adhesive compositions of the invention. However, in embodiments, molecular weight and morphology (e.g. branching) are suitably combined in a thermoplastic polymer to result in a melt flow rate, at 190° C. as defined by ASTM D1238 (MFR), of between about 2.5 g/10 min and 500 g/10 min; for example, in embodiments, MFR is between about 5 g/10 min and 100 g/min, or between about 10 g/10 min and 50 g/10 min. In some embodiments, the thermoplastic polymers have a glass transition temperature ($T_g$) that is less than −20° C. and is typically between about −20° C. and −80° C., or between about −30° C. and −70° C. If the thermoplastic polymer has a melting transition, the melting transition is between about 0° C. and 100° C. Preferred monomers for use in the thermoplastic polymers of the invention include ethyl acrylate, n-butyl acrylate, n-propyl acrylate, isopropyl acrylate, isobutyl acrylate, and similar lower acrylic acid esters having between 2 and 6 carbon atoms. In embodiments, suitable thermoplastic polymers for use in the compositions of the invention include ethylene-acrylic monomer-carbon monoxide terpolymers. Of these, terpolymers of ethylene, n-butyl acrylate, and carbon monoxide are particularly suitable. One example of such a terpolymer is ELVALOY® HB662, available from DuPont de Nemours of Wilmington, Del.

The thermoplastic polymer component is preferably present in the composition in an amount of from about 10% by weight to about 75% by weight, from about 20% by weight to about 70% by weight, or even from about 40% by weight to about 60% by weight.

Acrylic block polymers are used in formulating the moisture cure hot melt adhesives of the invention. The preferred acrylic block polymers of the invention have a first crystalline or semi-crystalline block and a second rubbery or amorphous block. In some embodiments, the acrylic block copolymer has more than one crystalline or semi-crystalline block and at least one rubbery block. The acrylic block copolymer can have a number average molecular weight ($M_n$) including both the crystalline or semi-crystalline blocks and the rubbery or amorphous blocks. Such polymers can have $M_n$ ranging from about 2,500 to about 300,000, more preferably from about 2,500 to 150,000, and even more preferably from about 4,000 to 150,000. Such molecular weights can be determined by conventional gel permeation chromatography techniques using conventional standards and columns.

The acrylic block polymer can have either a linear block structure or a branched block structure. In the block polymer of the invention, the crystalline or semi-crystalline block (a) can comprise about 20 to about 70 weight percent of the polymer and the rubbery or amorphous block (b) can comprise about 30 to about 80 weight percent of the copolymer.

The crystalline or semi-crystalline block of the acrylic block copolymer has a glass transition temperature (Tg) of at least about 50° C., for example about 80° C. to 150° C., or about 100° C. to 130° C. In the crystalline a semi-crystalline block, the monomer block (A) includes, in some embodiments, 40% to 99% by weight, more preferably 50 to 100% by weight, and even more preferably 80 to 99% by weight, of an acrylic monomer (a), in particular an acrylate ester monomer like PMMA, and preferably about 1% to 60% by weight, more preferably 0 to 25% by weight, a different vinyl monomer. Examples of suitable monomers constituting block (A) include acrylic acid, aliphatic hydrocarbon esters of acrylic acid such as methyl acrylate, isobutyl acrylate, t-butyl acrylate, and n-eicosyl acrylate; alicyclic hydrocarbon esters of acrylic acid such as norbornyl acrylate, aromatic hydrocarbon esters of acrylic acid such as phenyl acrylate and toluoyl acrylate; aralkyl esters of acrylic acid such as benzyl acrylate; acrylic acid esters of ether oxygen-containing functional group-containing alcohols; and acrylic acid fluoroalkyl esters; combined with acrylic acid, methyl acrylate, t-butyl acrylate, phenyl acrylate, benzyl acrylate, norbornyl acrylate, isobornyl acrylate, adamantyl acrylate, and acrylic acid alkyl esters whose alkyl moiety contains 13 to 20 carbon atoms (exclusive of isomyristyl acrylate, isopalmityl acrylate, isostearyl acrylate and isoeicosyl acrylate) are preferred from the viewpoint of pressure-sensitive adhesive characteristics, cost and ready availability and from the viewpoint of the glass transition temperature to be described later herein.

Other vinyl monomers can be used with the acrylate ester monomer constituting block (A) of the acrylic block copolymer. For example, methacrylate esters, aromatic alkenyl compounds, cyanovinyl compounds, conjugated diene compounds, halogenated unsaturated compounds, unsaturated dicarboxylic acid compounds, vinyl ester compounds, and maleimide compounds. Suitable methacrylate ester monomers, for example, include aliphatic hydrocarbon esters of methacrylic acid such as methyl methacrylate, t-butyl methacrylate, n-myristyl methacrylate, n-palmityl methacrylate, n-stearyl methacrylate and n-eicosyl methacrylate; alicyclic hydrocarbon esters of methacrylic acid such as norbornyl methacrylate, isobornyl methacrylate and adamantyl methacrylate; aromatic hydrocarbon esters of methacrylic acid such as phenyl methacrylate and toluoyl methacrylate; aralkyl esters of methacrylic acid such as benzyl methacrylate; methacrylic acid esters of ether oxygen-containing functional group-containing alcohols; and methacrylic acid fluoroalkyl esters. Suitable unsaturated dicarboxylic acid compounds include, for example, maleic anhydride, maleic acid, maleic acid monoalkyl esters and dialkyl esters, fumaric acid, and fumaric acid monoalkyl and dialkyl esters. Suitable vinyl ester compounds include, for example, vinyl acetate, vinyl propionate, vinyl pivalate, vinyl benzoate and vinyl cinnamate. Suitable maleimide compounds include, for example, maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide.

These may be used singly or two or more of them may be used in combination as a copolymer block segment constituting block (A) of the acrylic block copolymer. Among these recited monomers, a preferred one can be selected so that the block copolymer shows good compatibility with the thermoplastic resin and/or thermoplastic elastomer to be used in combination therewith. The molecular weight required of the block (A) may be selected according to the cohesive force required of the block (A) and the time required for production thereof by polymerization.

The rubbery block (B) of the acrylic block copolymer comprises preferably 50% to 100% by weight, more preferably 80% to 100% by weight, of an acrylic monomer (b), in particular an acrylate ester monomer, and preferably 0% to 50% by weight, more preferably 0% to 20% by weight, of some other vinyl monomer copolymerizable therewith. Polymer block (b) has a Tg of about 0° C. or less. In some embodiments, block (B) has a Tg of between about 0° C. and −100° C., or about −20° C. to −70° C., or about −20° C. to −50° C.

Suitable acrylate ester monomers constituting the block (B) of the acrylic block copolymer include, for example, acrylic acid aliphatic hydrocarbon esters such as ethyl acrylate, n-propyl acrylate, isopropyl acrylate, n-butyl acrylate, isobutyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, isomyristyl acrylate, isopalmityl acrylate, isostearyl acrylate and isoeicosyl acrylate; acrylic acid alicyclic hydrocarbon esters such as cyclohexyl acrylate; acrylic acid aromatic hydrocarbon esters; acrylic acid aralkyl esters; acrylic acid esters of ether oxygen-containing functional group-containing alcohols such as 2-methoxyethyl acrylate and 3-methoxybutyl acrylate; and acrylic acid fluoroalkyl esters.

These may be used singly or two or more of them may be used in combination in a copolymer block segment constituting block (B) of the block copolymer.

Among them, preferred in view of the pressure-sensitive adhesion, rubber elasticity and shock resistance of the resulting hot-melt adhesive composition and from the cost and ready availability viewpoint are acrylic acid alkyl esters (exclusive of tert-butyl acrylate) whose alkyl moiety contains 2 to 12 carbon atoms, isomyristyl acrylate, isopalmityl acrylate, isostearyl acrylate and isoeicosyl acrylate. Among these, n-butyl acrylate and 2-ethylhexyl acrylate are particularly preferred.

When the composition produced is required to have oil resistance, ethyl acrylate is preferred. When low-temperature characteristics are required, 2-ethylhexyl acrylate is preferred. Further, when oil resistance and low temperature characteristics are simultaneously required, mixtures of ethyl acrylate, n-butyl acrylate and 2-methoxyethyl acrylate are preferred.

As the other vinyl monomer copolymerizable with the acrylate ester monomer constituting the block (B), suitable examples include methacrylate esters, aromatic alkenyl compounds, cyanovinyl compounds, conjugated diene compounds, halogenated unsaturated compounds, unsaturated dicarboxylic acid compounds, vinyl ester compounds and maleimide compounds.

Suitable methacrylic acid esters as mentioned above include methacrylic acid aliphatic hydrocarbon esters such as ethyl methacrylate, n-propyl methacrylate, isopropyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, isomyristyl methacrylate, isopalmityl methacrylate, isostearyl methacrylate and isoeicosyl methacrylate; methacrylic acid alicyclic hydrocarbon esters such as cyclohexyl methacrylate; methacrylic acid aromatic hydrocarbon esters; methacrylic acid aralkyl esters; methacrylic acid esters of ether oxygen-containing functional group-containing alcohols such as 2-methoxyethyl methacrylate and 3-methoxybutyl methacrylate; and methacrylic acid fluoroalkyl esters.

Suitable aromatic alkenyl compounds include, for example, styrene, α-methylstyrene, p-methylstyrene and p-methoxystyrene. Suitable cyanovinyl compounds include, for example, acrylonitrile and methacrylonitrile. Suitable conjugated diene compounds include, for example, butadiene and isoprene. Suitable halogen-containing unsaturated compounds include, for example, vinyl chloride, vinylidene chloride, perfluoroethylene, perfluoropropylene and vinylidene fluoride. Suitable unsaturated dicarboxylic acid compounds include, for example, maleic anhydride, maleic acid, maleic acid monoalkyl esters and dialkyl esters, fumaric acid, and fumaric acid monoalkyl esters and dialkyl esters. Suitable vinyl ester compounds include, for example, vinyl acetate, vinyl propionate, vinyl pivalate, vinyl benzoate and vinyl cinnamate. Suitable maleimide compounds include, for example, maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide.

These may be used singly or two or more of them may be used in combination in a copolymer block segment constituting block (B) of the acrylic block copolymer. From among the above-mentioned vinyl monomers, an appropriate one can be selected for use according to the glass transition temperature required of the block (B), the elastic modulus and polarity thereof, the physical characteristics required of the pressure-sensitive adhesive composition to be produced, the compatibility of the copolymer with the thermoplastic resin and/or thermoplastic elastomer, among others. For improving the oil resistance of the pressure-sensitive adhesive composition, for instance, acrylonitrile can be used for copolymerization.

The molecular weight required of the block (B) may be selected according to the elastic modulus required of the block (B), the pressure-sensitive adhesive characteristics and the time required for the polymerization thereof, among others.

The above-mentioned elastic modulus and the tackiness are closely related to the mobility of molecular chains (in other words, glass transition temperature) and the molecular weight thereof, and intrinsic characteristics that result from specific monomer selections are manifested only at molecular weights exceeding a certain level. From this viewpoint, the range of the number average molecular weight $M_n$ required of the block (B) is preferably given by the relation $M_n>1,000$, more preferably $M_n>5,000$, still more preferably $M_n>10,000$, for instance. Since, however, higher number average molecular weights tend to prolong the polymerization time, the number average molecular weight is to be selected according to the required productivity; preferably, it is not higher than 500,000, more preferably not higher than 300,000.

Suitable examples of useful acrylic block copolymers have A and B blocks in an A-B-A triblock structure. Such triblock copolymers include a poly(methyl methacrylate)-b-poly(n-butyl acrylate)-b-poly(methyl methacrylate) triblock copolymer that is available from Kuraray America, Inc. of Houston, Tex. under the trade name SEPTON® LA2140e and having a weight average molecular weight of about 80,000 g/mole, 24 weight percent poly(methyl methacrylate) block and 76 weight percent poly(n-butyl acrylate block; a poly(methyl methacrylate)-b-poly(n-butyl acrylate)-b-poly(methyl methacrylate) triblock copolymer that is available from Kuraray Co. under the trade name SEPTON® LA2250 and having a weight average molecular weight of about 80,000 grams/mole, 33 weight percent poly(methyl methacrylate) total block content and 67 weight percent poly(n-butyl acrylate) total block content; and a poly(methyl methacrylate)-b-poly(n-butyl acrylate)-b-poly(methyl methacrylate) triblock copolymer that is available from Kuraray Co. under the trade name SEPTON® LA410 and having a weight average molecular weight of about 160,000 grams/mole, 21 weight percent poly(methyl methacrylate) total A block content and 79 weight percent poly (n-butyl acrylate) total B block content.

The adhesives of the invention include, in some embodiments, one or more tackifying agents, or tackifiers. Preferred tackifying agents are at least partially aromatic in character and have a ring and ball softening point of from about 50° C. to about 150° C., in embodiments from about 80° C. to about 120° C. Examples of suitable tackifying agents include aromatic, aliphatic-aromatic, aromatic modified alicyclic, and modified versions and hydrogenated derivatives thereof; terpenes (polyterpenes), modified terpenes (e.g., phenolic modified terpene resins), hydrogenated derivatives thereof and mixtures thereof; α-methyl styrene resins and hydrogenated derivatives thereof; and combinations thereof. Other useful tackifying agents are disclosed in, e.g., U.S. Pat. No. 6,355,317, and incorporated herein.

Suitable aromatic tackifying agents include natural and modified rosins such as gum rosin, wood rosin, tall oil rosin, distilled rosin, completely or partially hydrogenated rosin, dimerized rosin and polymerized rosin; rosin esters including, for example, glycerol and pentaerythritol esters of natural and modified rosins such as glycerol esters of pale wood rosin, glycerol esters of hydrogenated rosin, glycerol esters of polymerized rosin, pentaerythritol esters of hydrogenated rosin and phenolic-modified pentaerythritol esters of rosin; α-methyl styrene resins and hydrogenated derivatives thereof; low molecular weight polylactic acid; and combinations thereof.

The tackifying agent is preferably present in the composition in an amount of from about 5% by weight to about 60% by weight, from about 15% by weight to about 50% by weight, or even from about 20% by weight to about 40% by weight.

Adhesive Formulations.

Tables 2-4 include representative combinations, or formulations, of the components described above, wherein the formulations are within the scope of the invention.

TABLE 2

| Component | 1st embodiment (wt. %) | 2nd embodiment (wt. %) | 3rd embodiment (wt. %) |
|---|---|---|---|
| Isocyanate compound(s) | 5-25 | 7-20 | 10-15 |
| Acrylic Block Polymer | 5-25 | 7-25 | 10-20 |
| Thermoplastic Polymer | 5-25 | 7-20 | 10-17 |
| Polyether polyol | 15-40 | 20-30 | 25-35 |
| Aromatic Tackifier | 15-40 | 20-30 | 25-35 |

TABLE 3

| Component | 1st embodiment (wt. %) | 2nd embodiment (wt. %) | 3rd embodiment (wt. %) |
|---|---|---|---|
| MDI | 5-20 | 7-20 | 10-15 |
| PMDI | 1-10 | 4-7 | 5-10 |
| A-B Acrylic Block | 5-25 | 7-25 | 10-20 |
| Thermoplastic polymer | 5-25 | 7-20 | 10-17 |
| Polyether polyol (Mn 4000-12,200) | 5-40 | 10-30 | 25-35 |
| Polyether polyol (Mn 400-4000) | 5-40 | 10-30 | 15-25 |
| Aromatic Tackifier | 15-40 | 20-30 | 25-35 |

TABLE 4

| Component | 1st embodiment (wt. %) | 2nd embodiment (wt. %) | 3rd embodiment (wt. %) |
|---|---|---|---|
| MDI | 5-20 | 7-20 | 10-15 |
| PMDI | 1-10 | 4-7 | 5-10 |
| A-B Acrylic Block polymer | 5-25 | 7-25 | 10-20 |
| Thermoplastic ethylene-n-alkyl acrylate copolymer | 5-25 | 10-25 | 5-20 |
| Polyether polyol (Mn 4000-12,200) | 5-40 | 10-30 | 15-25 |
| Polyether polyol (Mn 200-4000) | 5-40 | 10-30 | 15-25 |
| Aromatic terpene-phenol Tackifier | 15-40 | 20-30 | 25-35 |
| Acrylate ester-carbon monoxide polymer | 5-25 | 10-25 | 15-25 |

In these formulations, either the block polymer or another thermoplastic polymer component contributes green strength to the formulation and reduces or eliminates the need for a crystalline polyester polyol component.

The moisture cure reactive hot melt adhesives of the invention can be conventionally manufactured using typical manufacturing techniques for moisture cure hot melt adhesives. Typically the components are blended above their respective melting points in commonly available processing equipment using technology that can assure the exclusion of moisture from the blending operations. The order of addition of the components and the addition rates can be modified by skilled adhesive chemists. Typically however the nonreactive ingredients including one or more polyols, one or more thermoplastic polymers, and the one or more tackifying agents are added keeping in mind the relative blendability and viscosity of the components. In one embodiment, the acrylic polymer(s) are blended with the polyol(s) at an acceptable blending temperature to obtain a fully incorporated and homogenous melt system. To that blend is added a tackifying agent, followed by the reactive isocyanate compound(s). Most commonly the components of the formulation are blended using an addition rate such that the materials can be uniformly blended into a melt without blending problems such as lack of dispersibility, precipitation, or phase separation. Suitable blending temperatures are typically in the range from about 60° C. to about 200° C.

The reactive isocyanate compound or compounds can be introduced into the reaction vessel at a blending temperature that maintains the isocyanate compound without substantial reaction particularly in the absence of moisture. Moisture is typically excluded from the reaction in the processing equipment using dry chemicals and conducting the blending operations under vacuum or in the presence of an anhydrous gas blanket. The anhydrous gas can be dry air, for example, or dry nitrogen or argon gas.

Methods of Using the Adhesives.

The hot melt moisture cure adhesives of the invention can be used in methods of bonding the first work piece or the second work piece into a finished unit using the bonding properties of the adhesive material. Methods of forming such a unit from the work pieces typically involve applying the moisture cure hot melt adhesive of the invention to one or more of the work pieces and combining the work pieces into a finished unit. Once the compositions are applied to at least one work piece, the work piece is contacted with a second work piece under environmental conditions that cause the hot melt moisture cure adhesive to cure to a mechanically stable permanent adhesive bond. The environmental conditions of the assembly operation must provide sufficient atmospheric moisture or humidity to facilitate the moisture cure reaction between the isocyanate compound or compounds and the formulation component(s) having an active hydrogen atom.

One advantage of the hot melt moisture cure adhesives of the invention is that after application but prior to cure, the green strength properties of the formulations help maintain the assembled unit in an intact form while the adhesive does cure to its final, mechanically stable bond structure The materials of the invention after manufacture but prior to cure are typically semi-solid or solid in nature and can be placed into conventional containers used for hot melt moisture cure adhesive materials. It is important to ensure that the containers do not contain moisture during filling and sealing and that the containers be maintained in such a way that moisture does not penetrate the containers into the adhesive material.

In order to apply the adhesive in the manufacturing operation, the solid or semi-solid material is melted and applied using conventional hot melt reactive materials.

The curing reaction occurs between the isocyanate compound or compounds and any formulation component having an active or reactive hydrogen atom. Such an active hydrogen can be found in compounds such as water, carboxylic acids, amines, and hydroxy compounds. The isocyanate compound reacts with these active hydrogen compounds to form a substantially permanent covalent bond. However the optimal bonding using the moisture cure hot melt of the invention occurs in the presence of a useful amount of atmospheric moisture or humidity. The vapor-phase water diffuses into the polymer matrix and reacts with the isocyanate groups to form urea linkages.

The reactive hot melt compositions of the invention are useful for bonding articles composed of a wide variety of substrates (materials), including but not limited to wood, metal, polymeric plastics, glass, rubber, and textiles. As such, these adhesives find particular use in applications such as use in water towers, for bonding to exterior surfaces, bonding to wood with high levels of pitch and e.g., in marine and automotive applications. Other non-limiting uses include textile bonding applications (carpet and clothing), use in the manufacture of footwear (shoes), use as a glazing/backbedding compound in the manufacture of windows, use in the manufacture of doors including entry doors, garage doors and the like, use in the manufacture of architectural panels, use in profile wrapping, use in bonding components on the exterior of vehicles, and the like.

The moisture cure reactive hot melt materials of the invention can be used to bond a variety of work pieces into a final unit using the bonding characteristics of the adhesive. Such work pieces can be made from a variety of materials including natural substances such as woods, nonwoven cellulosics, stone, etc., processed or synthetic materials such as refined metals including steel, aluminum and the like, synthetic polymer or plastic materials such as polyolefins, polyethylenes, polyamides and the like, and siliceous materials such as glass and the like. Examples of useful structures that can be assembled using the adhesives in the invention include windows, doors, motor vehicles such as automobiles and trucks, electronic equipment such as displays, computer housings, printer housings, and a plethora of other useful applications in which hot melt adhesives, moisture curable adhesives, or moisture curable hot melt adhesives are employed.

EXPERIMENTAL

Formulations of the invention were blended in the weight percent ratios shown in Table 5. All materials and their sources are described in the sections above. The adhesives were formulated by blending a first polyether polyol, ACCLAIM® 8200, with the terpene phenol tackifier under vacuum at between 135° C. and 150° C. until a homogeneous consistency was observed; then adjusting the temperature of the mixture to between 150° C. and 160° C. before adding the ethylene/n-butyl acrylate/carbon monoxide polymer and blending until a homogeneous consistency was observed; then adjusting the temperature of the mixture to between 150° C. and 165° C. before adding the acrylic block polymer SEPTON® LA-2140 and blending for about 1 hour or until a homogeneous consistency was observed; then then adjusting the temperature of the mixture to between 160° C. and 165° C. before adding a mixture of the second and third polyether polyols and mixing at temperatures of about 143° C. to 150° C. until a homogeneous consistency was observed; then continuing to stir the blend under vacuum sufficiently to remove essentially all residual moisture; then cooling the mixture to between about 130° C. and 135° C. before adding MDI and continuing to stir the mixture under vacuum for about 1 hour; then at temperatures of between about 130° C. and 135° C. adding the PMDI and blending until a homogeneous consistency was observed.

After releasing the vacuum, the blend was dispensed into dry containers and sealed for storage and future use.

TABLE 5

Formulation components and amounts for Examples 1-5.

| Component (source, trade name*) | Example No. (wt % of component) | | | | |
|---|---|---|---|---|---|
| | 1 | 2 | 3 | 4 | 5 |
| Polyether polyol (Bayer, Acclaim 8200) | 12.7 | 15.2 | 14.2 | 14.1 | 13.9 |
| Terpene phenol tackifier Dertophene, T-115 | 28.2 | 27.4 | 27.9 | 27.6 | 27.2 |
| Ethylene/n-Bu-acrylic/ carbon monoxide polymer (DuPont, Elvaloy HP662) | 12.7 | 12.5 | 10.2 | 11.5 | 11.3 |
| A-B Acrylic Block polymer (Kuraray, SEPTON® LA-2140) | 15.0 | 14.6 | 17.7 | 16.6 | 16.4 |
| Polyether polyol (Bayer, PPG2000) | 11.2 | 6.5 | 9.1 | 9.0 | 8.8 |
| Polyether polyol (Bayer, PPG425) | 6.0 | 7.5 | 6.7 | 7.6 | 7.5 |
| MDI (Bayer, Mondur M) | 11.7 | 12.2 | 11.7 | 11.1 | 10.9 |
| PMDI (Bayer, Mondur MR) | 2.5 | 4.1 | 2.5 | 2.5 | 4.0 |
| Total | 100.0 | 100.0 | 100.0 | 100.0 | 100.0 |

*For additional information on source and trade name, see description above.

The adhesive compositions of Examples 1-5 were tested for shear resistance and creep resistance. A moisture curable hot melt adhesive NP-2075, available from the H.B. Fuller Company of Vadnais Heights, Minn., was used as a Control (C) in the tests. The shear resistance test was a modified version of ASTM D 906-98. Results of wood-to-wood shear resistance for each of the formulations is shown in Table 6.

TABLE 6

Shear resistance, wood to wood, of the formulations of Examples 1-6.

| Shear Resistance (Wood to Wood) | Example No. (psi) | | | | | |
|---|---|---|---|---|---|---|
| | 1 | 2 | 3 | 4 | 5 | C |
| Ambient (23-30° C.) at 60 minutes | 184 | 203 | 178 | 181 | 202 | 169 |
| 37.7° C. (100° F.) at 60 minutes | 104 | 199 | 74 | 103 | 134 | 69 |
| 48.8° C. (120° F.) at 60 minutes | 75 | 161 | 48 | 77 | 107 | 27 |

Creep resistance, a measure of green strength, for each of the formulations is shown in Table 7. Creep resistance was measured according to the following procedure. A section of hardboard was coated with molten adhesive at a thickness corresponding to 9.5 g/ft². A timer was started immediately after coating the adhesive. Then a second piece of hardboard, 1"×4.5", was placed on the adhesive coat. The hardboard-adhesive-hardboard construction was then compressed in a compression nip. Once the timer reached at least 45 seconds, the adhered construction was situated with the 1"×4.5" section facing down, and a weight was hung from the 1"×4.5" section about 0.5" from the edge. The test result was rated a "Pass" if the weight did not fall after 3 minutes of hang time. Weights of 750 g, 1000 g, and 1500 g were used in repeated tests with multiple samples for each of the Example adhesive compositions.

TABLE 7

Creep resistance of the formulations of Examples 1-6.

| Creep Resistance (45 second Open Time) | Example No. | | | | | |
|---|---|---|---|---|---|---|
| | 1 | 2 | 3 | 4 | 5 | C |
| 750 grams | Pass | Pass | Pass | Pass | Pass | Fail |
| 1000 grams | Pass | Pass | Pass | Pass | Pass | Fail |
| 1500 grams | Pass | Pass | Pass | Pass | Pass | Fail |

Doors were manufactured employing the adhesives of the Examples and the Control (C) adhesive. Edge lift was measured for the doors manufactured employing the formulations of Examples C, 1, and 3. Of these, only the Control adhesive C exhibited edge lift. The formulations of Examples 1 and 3 exhibited no edge lift.

We claim:
1. A hot melt moisture cure adhesive composition comprising:
 (a) a reaction product of:
  (i) at least one compound having two or more isocyanate groups; and
  (ii) a first polyether polyol having a $M_n \geq 4000$ and a second polyether polyol having a $M_n < 4000$, a weight ratio of the first polyether polyol to the second polyether polyol ranging from 60:50 to 90:50;
 (b) an aromatic tackifying composition;
 (c) a thermoplastic polymer; and
 (d) an A-B or A-B-A acrylic block polymer wherein block A comprises an acrylic A block with a Tg of greater than 0° C. and an acrylic B block with a Tg of less than 0° C.
2. The adhesive of claim 1, wherein the adhesive that is free of a polyester polyol.
3. The adhesive of claim 1, wherein the adhesive that is free of a crystalline polyol.
4. The adhesive of claim 1, wherein the compound having two or more isocyanate groups comprises a blend of a methylene diisocyanate compound and an oligomeric methylene diisocyanate compound.
5. The adhesive of claim 1, wherein the first polyether polyol comprises a blend of a first polypropylene oxide ether polyol and a second polypropylene oxide ether polyol.
6. The adhesive of claim 5, wherein the number average molecular weight of the first polypropylene oxide ether polyol is about 4000 to about 12,200 and the number average molecular weight of the second polypropylene oxide ether polyol is about 200 to about 4000.
7. The adhesive of claim 1, wherein the aromatic tackifying composition comprises a terpene phenol tackifying resin.
8. The adhesive of claim 1, wherein the thermoplastic polymer comprises a terpolymer comprising an α-olefin, an acrylic monomer, and carbon monoxide.
9. The adhesive of claim 1, wherein the thermoplastic polymer comprises a polymer of ethylene, an n-alkyl acrylate, and carbon monoxide.
10. The adhesive of claim 1, wherein the thermoplastic polymer comprises a copolymer of ethylene, and n-butyl acrylate, and carbon monoxide.
11. The adhesive of claim 1, where the A-B or A-B-A acrylic block polymer has a number average molecular weight of 40,000 to 80,000, and about 10-40 wt % poly (methyl methacrylate) and 60-90 wt % of poly(n-butyl acrylate).

12. A hot melt moisture cure adhesive composition comprising:
   (a) a reaction product of:
      (i) at least one compound having two or more isocyanate groups; and
      (ii) a first polyether polyol having a number average molecular weight of about 4,000 to about 12,200 and a second polyether polyol having a number average molecular weight of about 200 to about 4,000, a weight ratio of the first polyether polyol to the second polyether polyol ranging from 60:50 to 90:50;
   (b) an aromatic tackifying composition;
   (c) a thermoplastic polymer; and
   (d) an A-B-A acrylic block polymer having a number average molecular weight of 40,000 to 80,000, and about 10 wt % to 40 wt % poly(methyl methacrylate) and 60 wt % to 90 wt % of poly(n-butyl acrylate).

13. The adhesive of claim 12, wherein the adhesive that is free of a polyester polyol.

14. The adhesive of claim 12, wherein the adhesive that is free of a crystalline polyol.

15. The adhesive of claim 12, wherein the compound having two or more isocyanate groups comprises a blend of a methylene diphenyl diisocyanate compound and an oligomeric methylene diphenyl diisocyanate compound.

16. The adhesive of claim 12, wherein the aromatic tackifying composition comprises a terpene phenol tackifying resin.

17. A hot melt moisture cure adhesive composition comprising:
   (a) a reaction product of:
      (i) at least one compound having two or more isocyanate groups;
      (ii) a blend of a first polyether polyol having a number average molecular weight of about 4,000-12,200, a second polyether polyol having a number average molecular weight greater than 1,000 and up to 4,000, and a third polyether polyol having a number average molecular weight of about 200-1000;
   (b) an aromatic tackifying composition;
   (c) an ethylene-acrylic thermoplastic copolymer; and
   (d) an A-B-A acrylic block polymer having a number average molecular weight of 40,000 to 80,000, and about 10 wt % to 40 wt % poly(methyl methacrylate) and 60 wt % to 90 wt % of poly(n-butyl acrylate).

18. The adhesive of claim 17, wherein the adhesive that is free of a polyester polyol.

19. The adhesive of claim 17, wherein the compound having two or more isocyanate groups comprises a blend of a methylene diphenyl diisocyanate compound and an oligomeric methylene diphenyl diisocyanate compound.

20. The adhesive of claim 17, wherein the aromatic tackifying composition comprises a terpene phenol tackifying resin.

* * * * *